United States Patent [19]

Mason

[11] Patent Number: 4,509,398
[45] Date of Patent: Apr. 9, 1985

[54] BLOCK GUIDE CUTTER

[76] Inventor: Preston A. Mason, 903 44th St., Oakland, Calif. 94608

[21] Appl. No.: 581,995

[22] Filed: Feb. 21, 1984

[51] Int. Cl.³ .............................................. B27B 9/04
[52] U.S. Cl. ....................................... 83/745; 83/574; 83/522; 83/485; 83/471.2; 33/427
[58] Field of Search ................. 83/745, 743, 574, 522, 83/471.3, 486.1, 471.2, 486, 485, 821, 829, 455, 468, 477.1; 33/427

[56] References Cited

U.S. PATENT DOCUMENTS

| | | | |
|---|---|---|---|
| 2,772,707 | 12/1956 | Leino | 83/745 |
| 4,031,794 | 6/1977 | Leihgeber | 83/745 X |
| 4,131,048 | 12/1978 | Dickes | 83/745 |

Primary Examiner—Donald R. Schran
Attorney, Agent, or Firm—Manfred M. Warren; Robert B. Chickering; Glen R. Grunewald

[57] ABSTRACT

A device for cutting blocks including a flat plate having an upward extending saw guide at one end and a fixed flange at the other with the distance between the saw guide and the flange being the length of a standard block, the device also including an adapter with a flange that is positionable between the first flange and the saw quide a distance preset for cutting another standard size block.

3 Claims, 4 Drawing Figures

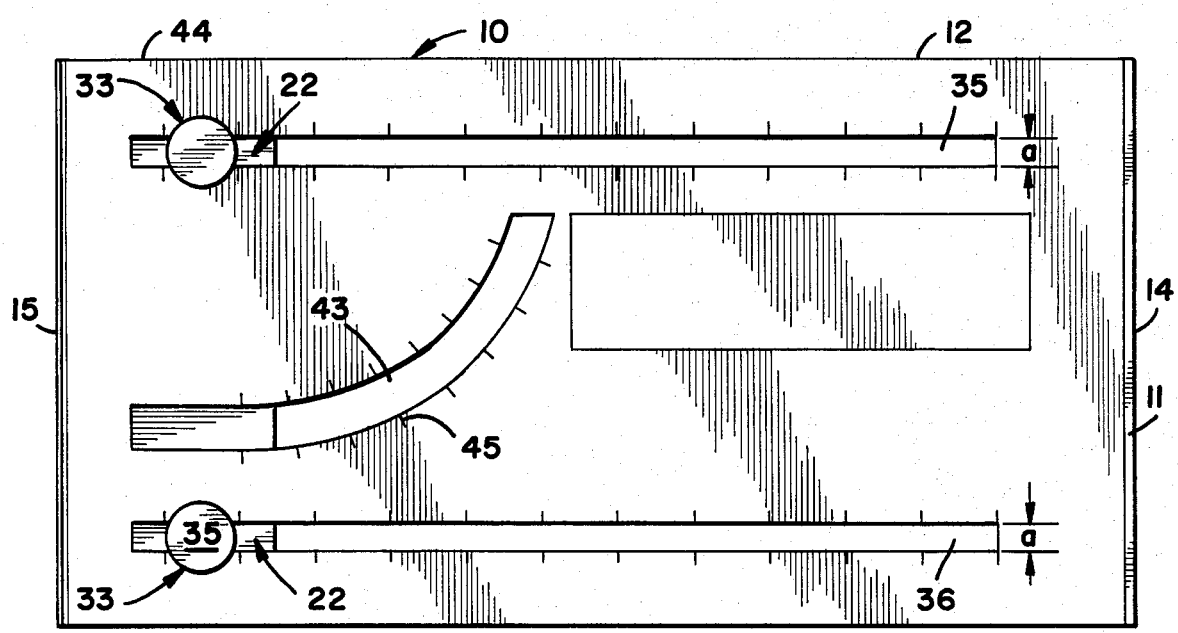
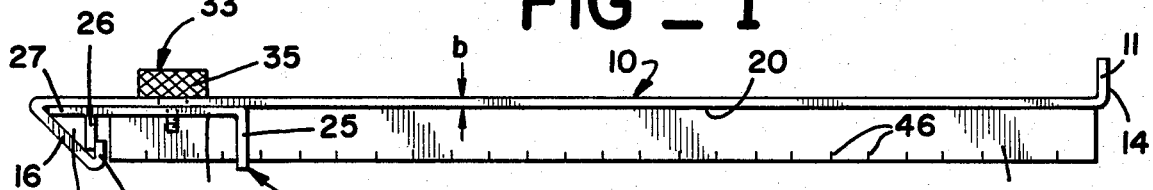
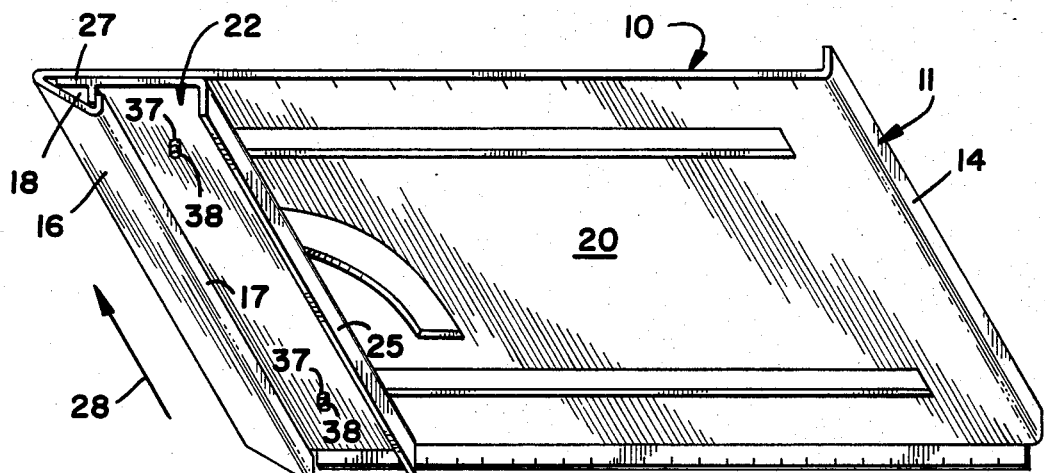
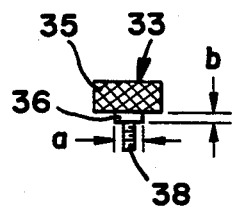

BLOCK GUIDE CUTTER

FIELD OF THE INVENTION

This invention is in the field of a carpenter's tool for cutting blocking.

BACKGROUND OF THE INVENTION

In constructing frame structures, walls are vertically supported by wooden studs which are usually 2×4's, and floors are supported by wooden beams called joists. The joists are normally 2×8's. In standard construction, studs and joists are spaced on 16-inch centers.

The joists are positioned to stand on their two-inch dimension and to span horizontal distances by being supported on their ends. The supports are on outside walls and on internal "bearing" walls. The joists, standing on their narrow edges, are stabilized by having short lengths of joist material nailed between them in a direction perpendicular to their lengths. These short stabilizing pieces are called "blocks" and the process of installing them is called "blocking".

The two-inch and eight-inch dimensions of joists are nominal. Actually those are dimensions before the wood is trimmed. A 2×8 is readlly only 1½ inches thick. Accordingly, when joists are installed on 16-inch centers the open space between them is 14.5 inches.

The process of cutting a block is usually effected by a carpenter measuring 14½ inches along each edge of the board from which the block is to be cut, drawing a line between those measured distances, and sawing along that line with a power hand saw. A skilled carpenter will be sure that the kerf is in the right place and the saw cut is square with regard to the edges of the block. A properly cut block will be easy to install, yet it will fit snuggly between adjacent joists, and its cut ends will be in contact from the top to the bottom of the joists being supported.

In ordinary construction, a series of joists will support the floor between an outside wall and an interior bearing wall. A second series of joists will support the floor of an adjacent room between that same bearing wall and a second bearing wall or a second outside wall. Above the bearing wall the ends of joists overlap and blocking installed between such lapped joists must be cut 13 inches long if the adjacent joists are on 16 inch centers. Carpenters installing blocking between lapped joists will employ the same technique described above except that the block will be cut 13 inches long.

When a series of joists is installed between two supporting walls, the first joist is 16 inches from the wall that is parallel to the long axes of the joists and each subsequent joist installed is on a 16-inch center from the one adjacent to it. However, the last joist to be installed may not be, and usually is not, exactly 16 inches from the wall that is parallel to it. In such cases, blocking between the final joist in a series and its parallel wall usually will be neither 14.5 inches nor 13 inches in length, but rather whatever length is needed to span the distance between the final joist and its parallel wall.

SUMMARY OF THE INVENTION

This invention is a tool that guides a saw to cut blocks square and exactly the proper length without the need for measuring and marking the material from which the block is cut. The device of this invention includes a plate-like body having flanges to engage the long edge of a board and the short edge of a board whereby a saw guide on one edge of the plate is positioned exactly where the board should be cut to make a block that is exactly the length of a standard block and square with the edges of the board. The device also includes an adapter that may quickly be slid into a receiving element on the bottom of the plate to provide a second flange which positions the saw guide to the exact position to cut a square block for a lapped joint.

In a preferred embodiment the adapter may be connected to rail-like elements on the device so that it may be preset to position the saw guide to cut blocks of any length. It is a further preferred embodiment of the invention to provide scales for measuring, scaling, and marking angles for cutting rafters, staircase stringers or the like.

The device of this invention also includes a saw guide to guide a power saw to cut a straight cut that is perpendicular to the finished edges of the board.

BRIEF DESCRIPTION OF THE DRAWINGS

FIG. 1 is a plan view of a device embodying this invention.

FIG. 2 is an elevation view of FIG. 1.

FIG. 3 is a perspective view of the underside of the device illustrated in FIG. 1 and FIG. 2.

FIG. 4 is an elevation view of a connector employed to hold the adapter illustrated in FIG. 2.

DETAILED DESCRIPTION OF THE INVENTION

The device embodying this invention is generally designated 10 and in the illustrated embodiment the main body of the device 10 is made of a single piece of metal such as aluminum. The device includes a saw guide 11 which is formed, in the illustrated embodiment, by bending up one edge of the plate from which the device is made. The saw guide 11 is in a plane that is perpendicular to the main plane of the device 10 and it is bent at 90° from the main plane. The saw guide 11 is perpendicular to the side edge 12 which in turn is bent down to form a work-engaging flange 13 which is also perpendicular to the plane of the main plate 10. The planes of work-engaging flange 13 and saw guide 11 are perpendicular to one another.

In the embodiment illustrated the end 15 of the device is bent downwardly, as best illustrated in FIG. 2, to provide a spanning element 16 which forms an acute angle with the lower surface of the plate 10 and terminates in a work-engaging element 17 that lies in a plane perpendicular to the plane of the bottom surface of plate 10 and parallel to the plane of saw guide 11.

In the illustrated embodiment, the spanning element 16 and work-engaging element 17 form a partial cavity 18 which serves as a locking means for an adapter as described in more detail below.

An adapter generally designated 22 is formed with a plate-like back 23 from which extend a work-engaging element 25 and an interlock element 26. The interlock element extends from the back 23 a distance in from its edge to form an extension 27. The interlock element 26 and the extension 27 engage two corners of cavity 18 thereby holding adapter 22 in place and with work-engaging element 25 in a plane parallel with saw guide 11. Adapter 22 can slide from its interlocked position illustrated in FIG. 2 and FIG. 3 by moving it in the direction of arrow 28 in FIG. 3. However, the work-engaging element 25 butts up against work-engaging flange 13 so that the adapter 22 is held in place against all movement except in the direction of arrow 28.

The device is illustrated with locking elements 33 in place, however when adapter 22 is interlocked in cavity 18 with interlock element 26 and extension 27, locking elements 33 are not necessary to hold it in place.

The device illustrated in the Figures is provided with open slots 35 and 36 in the main body of the device. The slots 35 and 36 are parallel to side edge 12. Slots 35 and 36 should run substantially the length of the device, or at least to any place where one would desire to position adapter 22 as will be explained in more detail hereinafter. Slots 35 and 36 preferably are equipped with scales which read the distance between the outside surface of work-engaging element 25 and the corresponding surface of saw guide 11 as will be explained in more detail hereinafter.

When adapter 22 is not engaged in cavity 18 as illustrated, it may be fixed in any position along the lengths of slots 35 and 36 by being locked to the bottom of the device with locking elements 33. Locking elements 33 have a upper portion 35 that is larger in diameter than the width of slots 35 and 36 which is illustrated as the Dimension a in FIG. 1. Beneath the top 35 is a circular positioning element 36 that has a diameter slightly smaller than Dimension a and a thickness that is the same as the thickness of the plate shown as Dimension b in FIG. 2 and in FIG. 4. The adapter 22 is provided with two threaded holes 37 that have the proper diameter and the proper threads to receive threaded element 38 extending from the bottom of locking element 33. With this arrangement, adapter 22 can be removed from cavity 18 by moving it in the direction of arrow 28, it can be positioned at any point in contact with undersurface 20 and fixed firmly in place by positioning locking elements 33 as illustrated in FIG. 2 and making up the threaded elements 38 to hold the adapter firmly against undersurface 20.

Although not essential to this invention, the device may have other beneficial features. One such feature is the arc-shaped slot 43 which is provided with a scale having elements that converge at point 44. Point 44 represents the position on the upper surface of the device that is immediately above the work-engaging surface 17 and when the work-engaging surface is held against an edge of a board, the scale 45 can be used to mark pre-selected angles. Preferably the angles in scale 45 mark most-used angles such as those for cutting stair stringers and rafters. Slot 43 may be straight or may be curved at a different radius than as illustrated.

Other edges may also be provided with scales. For example, work-engaging flange 13 may have a scale 46 that can be used with blueprints indicating directly in feet or meters a length represented on a drawing.

Use of the device of this invention will be described with reference to standard construction dimensions although it is evident that the device may be dimensioned for whatever dimensions are standard in a local area of the world. For use in most areas of the United States, the distance between the work-engaging surface of work-engaging element 17 and the surface 14 of saw guide 11 will be 14.5 inches. Blocks 14.5 inches long will fit snugly between nominal 2×8 joists installed on 16-inch centers. By far the largest use of the device of this invention will be with adapter 22 removed, with work-engaging element 17 held snugly against the edge of a board from which the blocking is made, and with saw guide 11 positioned immediately above the portion of the board that should be cut to produce a block of exactly the right length.

Adapter 22 will be made such that when it is engaged in cavities 18 work-engaging element 25 will engage the edge of a board exactly 13 inches from surface 14 of saw guide 11 whereby when a cut is made along saw guide 11 the block that is cut will be exactly 13 inches long and will be square. Blocks made in this manner are exactly the right length for blocking joists between overlaps. When blocks of any other length are to be made adapter 22 is removed from cavity 18, positioned beneath the device and held against surface 20 with locking elements 33. Adapter 22 can be seen through slots 35 and 36 and can be positioned so that the work-engaging surface of element 25 is at any measured distance from surface 14 of saw guide 11. By simply observing the position of adapter 22 through slots 35 and 36 and using the scale to position adapter 22 the right distance from the saw guide. When that distance is found it can be maintained by tightening locking elements 33 which provide enough friction between surface 20 and adapter 22 to hold it in place.

The particular device illustrated in the drawings is only one embodiment of the invention. The flanges and holding elements are illustrated as being bent from a flat plate. These elements may be separate elements that are welded or otherwise fixed to the device. The adapter may be held in its fixed position with engaging means other than the cavity 18 as illustrated and the adapter may be held in variable positions with locking means other than the threaded locking means illustrated.

What is claimed is:

1. A block cutting tool comprising a flat, rectangular plate having an upper face and a lower face;
   a saw guide extending from an edge of said plate above and in a plane perpendicular to said upper face;
   a work-engaging means extending from the lower face of said plate parallel to and at a fixed distance from said saw guide;
   a second engaging means extending from the lower face of said plate, said second work-extending means lying in a plane perpendicular to the plane of said saw guide;
   an adapter including third work-engaging means; and
   releasable means to hold said adapter with said third work-engaging means parallel to said saw guide, at a fixed predetermined distance from said saw guide, and with said third work-engaging means positioned between said saw guide and said work-engaging means.

2. The device of claim 1 having elongated means perpendicular to the plane of said saw guide, said elongated means including locking means for locking said adapter beneath the lower face of said plate at any of a plurality of distances from said saw guide.

3. The device of claim 2 wherein said elongated means inclues indicia indicating the distance between said third work-engaging means and said saw guide.

* * * * *